United States Patent [19]

Hibi et al.

[11] Patent Number: 4,527,273
[45] Date of Patent: Jul. 2, 1985

[54] MAGNETIC DISC DEVICE

[75] Inventors: Yasumori Hibi, Chigasaki; Hideo Matsuura, Kawasaki, both of Japan

[73] Assignee: Fujitsu Limited, Kawasaki, Japan

[21] Appl. No.: 434,889

[22] Filed: Oct. 18, 1982

[30] Foreign Application Priority Data

Oct. 21, 1981 [JP] Japan ............... 56-168338

[51] Int. Cl.³ ............................. G06F 11/10
[52] U.S. Cl. ...................... 371/38; 371/13; 371/31
[58] Field of Search ............ 371/13, 33, 38, 12, 371/31

[56] References Cited

U.S. PATENT DOCUMENTS

| 3,340,512 | 9/1967 | Hauck et al. ............... 364/200 |
| 3,569,934 | 3/1971 | Parr, Jr. ...................... 371/31 |
| 3,771,136 | 11/1973 | Heneghan et al. .......... 364/200 |
| 3,997,876 | 12/1976 | Frush ......................... 364/200 |
| 4,112,502 | 9/1978 | Scheuneman .............. 371/38 X |
| 4,146,099 | 3/1979 | Matsushima et al. ...... 371/31 X |
| 4,202,018 | 5/1980 | Stockham, Jr. ............. 371/31 X |
| 4,223,390 | 9/1980 | Bowers et al. .............. 364/900 |
| 4,315,331 | 2/1982 | Lemoine et al. ............ 371/31 |
| 4,319,356 | 3/1982 | Kocol et al. ................ 371/38 |

OTHER PUBLICATIONS

IBM Technical Disclosure Bulletin, vol. 22, No. 11, Apr. 1980, pp. 5065-5066.
IBM Technical Disclosure Bulletin, vol. 18, No. 10, Mar. 1976, pp. 3428-3429.
Proceedings of the IEEE, vol. 64, No. 6, Jun. 1976, "A Peripheral-Oriented Microcomputer System," pp. 860-873.

Primary Examiner—Jerry Smith
Assistant Examiner—Mark Ungerman
Attorney, Agent, or Firm—Staas & Halsey

[57] ABSTRACT

In a magnetic disc device, track bytes are added to a record which is to be stored in a cylinder of a magnetic disc in order to utilize additional magnetic disc devices of a different type in the same manner as the first-mentioned magnetic disc device. The magnetic disc device provides track byte check device which checks track bytes read from the record for errors, stores the track bytes in a track byte register when they are correct, and, if the stored track bytes are re-read, utilizes the correct contents stored in the track byte register as the track bytes of the record.

3 Claims, 3 Drawing Figures

MAGNETIC DISC DEVICE

BACKGROUND OF THE INVENTION

The present invention relates to a magnetic disc device designed for ease of compatibility with other magnetic disc devices. Particularly, it relates to a system for processing track bytes of a magnetic disc device.

There is a widely known memory system in which a magnetic disc device is compatibly used with a different type of magnetic disc device having a different memory capacity or a different amount of data (bytes) stored in a track or cylinder without changing the program of the central processing unit (CPU), as disclosed in Japanese Unexamined Patent Publication (Kokai) No. 52-28231 (corresponding to U.S. Pat. No. 4,223,390. A memory system of this type makes use of a record format which consists of a count portion, an error check code (ECC) therefor, a track byte portion, a key portion, an ECC therefor, a data portion, an ECC therefor, and gaps. As is well known, a magnetic disc device is usually provided with a pluraliy of magnetic discs, and the data is written in many concentric circles (tracks or cylinder) determined by position signals that are generated by a servo disc among the plurality of magnetic discs. Each cylinder has a starting point, and the position of the data stored in the cylinder is indicated by the distance (such as byte length or sector number) from the starting point. The data is packed in the above-mentioned format (record) and is recorded on the cylinder. Each cylinder has a large number of bytes so that many records can be written thereon.

In such a magnetic disc device, the recorded data is read in the order of the counter portion, the ECC thereof, the track byte, the key portion, the ECC thereof, etc. to check for errors. If an error exists in the key portion, for example, the process of reading out the recorded data is retried. The recorded data is read with the magnetic head of the disc deviating toward the right or left relative to the center line of the cylinder since the data is written with the magnetic head deviating toward the right or left relative to the center line of the cylinder due to thermal expansion or some other factor. Due to deviation of the magnetic head, the data can be correctly read from a portion where an error existed in the previous read operation. It is possible, however, that data may not be correctly read from the portions from which the data was correctly read in the previous read operation. But since a host disc control-device (DKC) stores correctly read data in an internal register, no problem arises even if the data is subsequently incorrectly read. However, in the conventional system, an adapter (ADP) and DKC do not store track byte information following the reading of the count portion, and the track bytes that were correctly read in the previous read operation disappear or are overwritten during retry. Therefore, if the track bytes are not correctly read at this time, incorrect information is stored in the ADP. A host unit generally does not transfer the track bytes and overlooks this fact. Hence, if the data is correctly read from the key portion, the data read from the data portion is received from the host unit. If the data portion is correct, the instructions for re-reading are terminated. Consequently, the ADP holds incorrect track bytes. When the recorded data is to be written in the next available region of the same track, the track bytes of the next region are prepared based upon the incorrect track bytes. The thus-prepared incorrect track bytes are then written in the track byte portion of the next track and the operation is repeated. Therefore, all of the track bytes of the subsequent records become erroneous, making it difficult to read the data.

SUMMARY OF THE INVENTION

An object of the present invention is to provide a magnetic disc device which eliminates the above-mentioned problem.

Another object of the present invention is to provide a magnetic disc device in which the track bytes can be suitably processed and the effectiveness can be increased.

The above-mentioned objects can be achieved, according to the present invention, by a magnetic disc device in which track bytes are added to a record which is to be stored for the cylinder of a magnetic disc in order to utilize an additional magnetic disc device of a different type in the same manner as the magnetic disc device. The magnetic disc device is provided with means for checking track bytes read from the record for errors, storing the track bytes in a track byte register when they are correct, and out at a later reading, utilizes the contents track byte register whenever the track bytes are re-read.

Further features and advantages of the present invention will be apparent from the ensuing description, with reference to the accompanying drawings, to which, however, the scope of the invention is in no way limited.

DESCRIPTION OF THE PREFERRED EMBODIMENT

Figure 1:
FIG. 1 is a diagram which illustrates a record format used in a magnetic disc device according to the present invention.

There is a widely known memory system in which a magnetic disc device is used compatibly with a different type of magnetic disc device having a different memory capacitor or a different amount of data (bytes) stored in a track or cylinder without changing the program of a CPU to which the drives are attached, as disclosed in Japanese Unexamined Patent Publication (Kokai) No. 52-28231 (corresponding to the U.S. Pat. No. 4,223,390). A memory system of this type makes use of the record format which is illustrated in FIG. 1. The record of FIG. 1 comprises a count portion, an ECC therefor, a track byte portion, a key portion, an ECC therefor, a data portion, an ECC therefor, and gaps. As is well known, magnetic disc device is usually provided with a plurality of magnetic discs, and the data is written in many concentric circles (tracks or cylinders) determined by position signals that are generated by a servo disc among the plurality of magnetic discs. Each cylinder has a starting point, and the position of the data stored in the cylinder is indicated by the distance (such as byte length of sector number) from the starting point. The data is packed in the above-mentioned format (record) and is recorded on the cylinder. Each cylinder has a large number of bytes so that many records can be written thereon.

The count portion in FIG. 1 stores the cylinder number, the record number, and data related to the length of the key portion and the data portion. The key portion is a region which stores data for easily and quickly retrieving the record, and the data portion is a region which stores the data that is to be recorded. The length of these regions is variable. The track byte portion is a region which stores the data required to make the device compatible and which is a feature of the above-mentioned compatible memory system. That is, the track byte portion stores the data mentioned below.

For example a first magnetic disc device has a capacity of 200 MB and a second magnetic disc device has a capacity of 317.5 MB. The cylinder capacity is 19,968 bytes for the former device and 28,160 bytes for the latter device. When the cylinders have different capacities, as described above, the records are located at dissimilar positions on the cylinders in the first magnetic disc device and the second magnetic disc device even when the same group of records is written. Furthermore, in general, if the memory capacities are not the same, the record length becomes different even through the magnetic disc devices employ the same counter-key-data (CKD) format (the format of FIG. 1 from which the track bytes are removed) and even though each piece of data has the same byte length. For instance, in the format of FIG. 1, each gap provides a time margin which is necessary for processing the read data of the preceding portion and for switching the operational mode. Usually, however, the gap length changes depending upon the type of magnetic disc. Further, the count portion and the key portion usually have different lengths. The same holds true even for the ECC. For instance, the ECC in the first magnetic disc may have 7 bytes, and the ECC in the second magnetic disc may have 6 bytes. Therefore, even when the data portions have the same number of bytes, the record length, which is the sum of each of the portions, becomes different between the first magnetic disc and the second magnetic disc. For these reasons, the record is located in different positions with respect to the starting point of the cylinder, depending upon whether the data is recorded in the CKD format on the first magnetic disc and on the second magnetic disc. The positions of the records on the cylinder are stored in a software program and are utilized for reading the data. However, the difference of position caused by the use of different magnetic disc devices makes it difficult to process data by using one program (i.e., it is difficult to control the second magnetic disc device using a program which is prepared based upon the characteristics of the first magnetic disc device). The track bytes cope with this compatibility problem. Namely, when the magnetic disc on which the data is to be written is in the first magnetic disc device, the track bytes encode the number of bytes that exist between the index (the starting point of the cylinder) and the starting point of the record to which the track bytes belong. If such track bytes are added to the record format of the second magnetic disc device, the record can be identified by reading the track bytes and can be processed in the same manner as the first magnetic disc. In other words, the CPU is allowed to equally access the first and second magnetic disc devices using one program.

Figure 2:
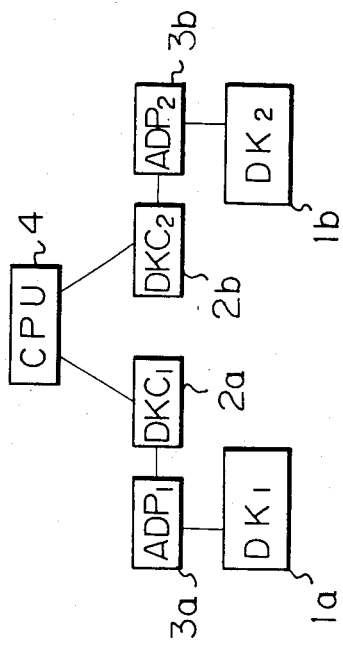
FIG. 2 is a block diagram which illustrates the outline of a conventional compatible magnetic device.

The track bytes are manipulated by the magnetic disc control device but are not sent to the CPU. This is quite natural in view of the features of the system because the first magnetic disc device and the second magnetic disc device are processed by the CPU as if they were identical (that is, the differences between the disc devices are invisible to the CPU). FIG. 2 schematically illustrates a magnetic disc memory system in which $1a$ denotes the first magnetic disc device ($DK_1$) having a capacity of 200 MB, and $1b$ denotes the second magnetic disc device ($DK_2$) having a capacity of 317.5 MB. Magnetic disc control devices ($DKC_1$ and $DKC_2$) $2a$ and $2b$ are connected to a common central processing unit (CPU) 4, and to the magnetic disc devices ($DK_1$, $DK_2$) $1a$ and $1b$ via adaptors ($ADP_1$, $ADP_2$) $3a$, $3b$, respectively. The magnetic disc device is provided with a servo disc, as mentioned earlier, which produces cylinder number data, data concerning the starting point of the cylinder, and the pulse for every byte from the starting point. The track bytes are obtained by reading the track bytes of the preceding record and counting the pulses, and are written on the track byte portion of the desired record. A track byte counter for counting the pulses is contained in the adaptors. Among the record data read from the magnetic disc, the count portion, key portion, data portion, and ECCs thereof are sent to the CPU via the adaptors and the magnetic disc control devices, and are used after they are checked for errors and corrected by the ECCs. The track bytes are checked for parity by the adaptors and are used in the magnetic disc control devices to calculate the track bytes of the next record.

A problem arises in that the recorded data is read out in the order of the counter portion, the ECC thereof, the track byte, the key portion, the ECC thereof, etc. to check for errors. If an error exists in the key portion, the reading process is repeated. The recorded data is read with the magnetic head deviating toward the inner side or outer side relative to the center line of the track since the data is written with the magnetic head deviating toward the inner side or outer side relative to the center line of the track due to thermal expansion at the time of writing or some other factor. Due to deviation of the head, the data can be correctly read from a portion where an error existed in the previous reading. It is possible, however, that the data may not be correctly read from the portions from which the data was correctly read in the previous read operation. But since a DKC stores correctly read data in an internal register, no problem arises even if the data is subsequently incorrectly read. However, in the conventional system, the ADP and the DKC do not have the function of storing track byte information following the reading of the count portion, and the track bytes that were correctly read in the previous read operation disappear or are over-written at this time. Therefore, if the track bytes are not correctly read in a re-read operation, incorrect information is stored in the ADP. A host disc control device does not transfer the track bytes and overlooks this fact. Hence, if the data is correctly read from the next key portion, the data read from the data portion is received. If the data is correct, the instructions for re-reading are terminated. Consequently, the adapter holds incorrect track bytes. When the recorded data is to be written in the next region of the same track, the track bytes of the next region are prepared based upon the incorrect track bytes. The thus-prepared incorrect track bytes are then written in the track byte portion of the next track and the operation is repeated. Therefore, all of the track bytes of the subsequent records become erroneous, making it difficult to read the data.

In order to eliminate the above-mentioned drawback, according to the present invention, the magnetic disc device is provided with an external buffer register for storing the track bytes and writes the track bytes into the external buffer register when they are correctly read. Once the correct track bytes are written into the external register buffer, the track bytes which are subsequently read are ignored, and the track bytes for preparing the track bytes of the next record are supplied from the external buffer register. Thus, the above-mentioned drawback can be easily and reliably overcome. When the data of the key portion is correctly read in the re-read operation, the data is then read from the data portion. When the data is confirmed to be correct by the ECC, the re-read operation is completed, and the device processes the next record.

Figure 3:
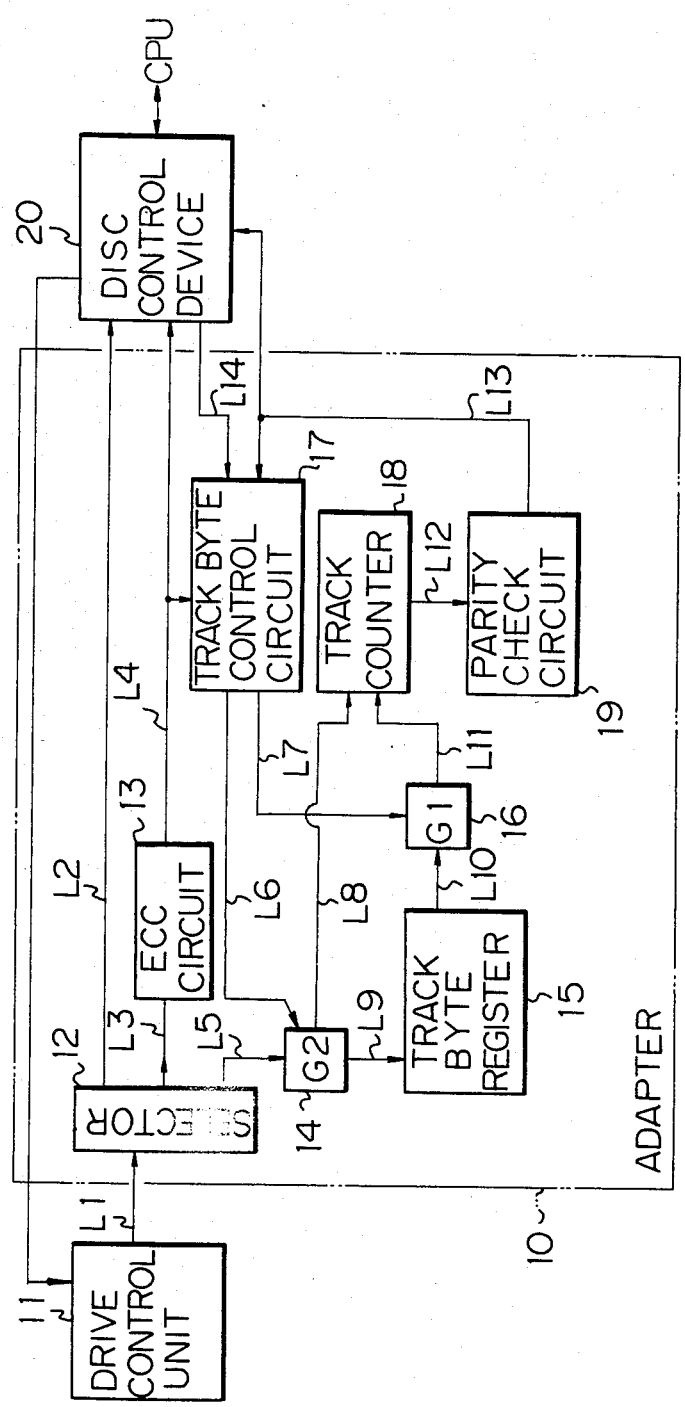
FIG. 3 is a block diagram which illustrates an embodiment of the magnetic disc device according to the present invention.

FIG. 3 illustrates the hardware involved in the operation described above, in which 10 denotes the adapter, 11 denotes a drive control unit for the magnetic disc device, 12 denotes a selector, 13 denotes an ECC circuit, 14 denotes a gate, 15 denotes a track byte register, 16 denotes a gate, 17 denotes a track byte control circuit, 18 denotes a track counter, 19 denotes a parity check circuit, and 20 denotes the disc control device.

Next, the process of operation of the circuit shown in FIG. 3 will be explained.

1. Initial operation (Assume that a data check is carried out for the key portion)

1-a At first, if the command is issued from the disc control device 20 to the adapter 10 via a line $L_{14}$, the information in the count portion read from a disc medium is supplied from the device control unit 11 to the selector 12 in the adapter 10 via a line $L_1$ and further to the disc control device 20 via a line $L_2$. Further, said information is supplied to the ECC circuit 13 via a line $L_3$ so as to check the information.

1-b Next, the information in the ECC for the count portion is supplied similarly via the line $L_1$ to the adapter 10. This information in the ECC is not supplied to the disc control device 20 but is supplied only to the ECC circuit 13 so as to check the information in the count portion.

1-c Next, the information in the track byte is similarly supplied via the line $L_1$ to the adapter 10. This information in the track byte is not supplied to the disc control unit 20 but to the gate ($G_2$) 14 via a line $L_5$. The gate 14 is controlled by the track byte control circuit 17 via a line $L_6$. At the initial reading, the information in the track byte is sent to the track counter 18 via a line $L_8$, and, at the same time, the information is sent to the track byte register 15 via a line $L_9$. At this time, the track byte control circuit 17 checks a line $L_4$ and a line $L_{13}$ and judges whether or not the information in the track byte which is read out is correct. The line $L_4$ contains the data from the ECC circuit 13. The ECC circuit 13 judges whether or not the information in the count portion is correct, based on the previously read out information in the count portion and the ECC information thereof. If an abnormality is present the ECC circuit 13 announces the abnormality to the track byte control circuit 17 and the disc control circuit 20 via the line $L_4$. The line $L_{13}$ is used to announce a parity check of the track counter 18 to the track byte control circuit 17 and the disc control device 20.

1-d The information in the count portion is supplied to the disc control device 20, and if there is no data check and no parity check of the track counter 18, the disc control device 20 sends a command to the adapter 10 to read the key portion. The information in the key portion is similarly supplied via the lines $L_1$ and $L_2$ to the disc control device 20 and via the line $L_3$ to the ECC circuit 13.

1-e Next, the information in the ECC for the key portion is similarly supplied to the ECC circuit 13 via the lines $L_1$ and $L_3$. At this time, a data check is carried out and is announced to the disc control circuit 20 via the line $L_4$. When the disc control circuit 20 being recognizes that a data check has occurred in the key portion, the circuit 20 renders the magnetic head in the drive control circuit 11 in the off state via line $L_{15}$, and the re-read operation is commenced. When the key portion is read, the track counter 18 is operated as a counter, and the value of the track byte does not remain in the track counter.

2. Retry operation 2-a As the initial operation, the information is read beginning with the count portion. First, the information in the count portion and the ECC thereof is read. At this time, if the magnetic head is in the off-track state, a data check operation is carried out. However, even if a data check operation is commanded, the disc control unit 20 holds the information in the count portion, which information was read in the initial read operation, ignores the data check and continues reading until the key portion is read. After the information in the ECC for the count portion is supplied to the disc control device 20, the information in the track byte is supplied from the drive control unit 11 to the disc control device 20. At this time, the track byte control circuit 17 recognizes, based on the command supplied from the disc control device 20 and the internal state of the adapter 10, that the retry operation is being carried out. Therefore, the track byte control circuit 17 closes the gate ($G_2$) 14 via the line $L_6$ and opens the gate ($G_1$) 14 via the line $L_7$ so that the information in the track byte is supplied from the track byte register 15 to the track counter 18.

2-b Next, the key portion is read. At this time, if no error is found, the data in the data portion is also read. If an error is found at this time, an operation similar to the one in 2-a is carried out.

As mentioned above, the track byte register 15 stores track bytes from the drive control unit 11 when they are correct. That is, the adapter 10 checks the parity of the track bytes and stores the track bytes in the track byte register 15 when they are correct. The adaptor 10 further operates the gates 14, 16 so that the contents stored in the track byte register 15 are input into the track counter 18.

According to the present invention as described in the foregoing, the track bytes can be suitably processed, and the compatible magnetic disc device can be used more effectively.

I claim:

1. A magnetic disc device in which track bytes are added to a record which is to be stored in a magnetic disc in order to utilize an additional magnetic disc device of a different type in the same manner as said magnetic disc device, said magnetic disc device comprising:

checking means, operatively connected to receive the track bytes of said record, for checking the track bytes of said record for errors; and a track byte register, operatively connected to receive the track bytes of said record, for storing said track bytes when they are correct, and supplying the track bytes stored in said track byte register as the track bytes of said record when said record is re-read due to detection of an error.

2. A magnetic disc device according to claim 1, wherein said magnetic disc device is operatively connected to a first disc control device having first, second and third inputs, and an output, and said additional magnetic disc device is operatively connected to a second disc control device, said first and second disc control devices being operatively connected to a common central processing unit, and wherein said magnetic disc device further comprises:
a drive control unit; and
an adapter, comprising:
a selector having an input operatively connected to said drive control unit and having a first output operatively connected to the first input of said first disc control device and having second and third outputs;
an error code checking circuit having an input operatively connected to the second output of said selector and an output operatively connected to the second input of said first disc control device;
a first gate having an input operatively connected to the third output of said selector and having first and second outputs, said track byte register being operatively connected to the first output of said first gate;
a second gate having an input operatively connected to said track byte register and having an output;
a track counter having a first input operatively connected to the second output of said first gate and a second input operatively connected to the output of said second gate, and having an output;
a parity check circuit having an input operatively connected to the output of said track counter and an output operatively connected to the third input of said first disc control device; and
a track byte control circuit having a first input operatively connected to the output of said first disc control device and a second input operatively connected to the output of said parity check circuit, and having a first output operatively connected to and controlling said first gate and a second output operatively connected to and controlling said second gate.

3. An information processing system, comprising:
a central processing unit;
a disc control device operatively connected to said central processing unit;
a drive control unit including a disc for storing records, each record including track bytes; and
an adapter, comprising:
a selector operatively connected to said drive control unit and said disc control device;
an error code checking circuit, operatively connected to said selector and said disc control device, for checking the track bytes read from said disc for errors;
a first gate operatively connected to said selector;
a track byte register, operatively connected to said first gate, for storing the track bytes when they are correct and supplying the track bytes stored in said track byte register as the track bytes of said records if said records are re-read;
a second gate operatively connected to said track byte register;
a track counter operatively connected to said first and second gates;
a parity check circuit operatively connected to said track counter and said disc control device; and
a track byte control circuit, operatively connected to said disc control device, said parity check circuit and said first and second gates, for controlling said first and second gates.

* * * * *

UNITED STATES PATENT AND TRADEMARK OFFICE
CERTIFICATE OF CORRECTION

PATENT NO. : 4,527,273
DATED : July 2, 1985
INVENTOR(S) : HIBI ET AL.

It is certified that error appears in the above-identified patent and that said Letters Patent is hereby corrected as shown below:

```
Column 2, line 24, "out at a later reading, uitlizes"
      should be --utilizing--;
          line 25, after "contents" insert --of the--;
          line 59, after "known," insert --a--;
          line 66, "of" should be --or--.
Column 3, line 14, "example" should be --example,--;
          line 24, "through" should be --though--.
Column 6, line 14, delete "being".
```

Signed and Sealed this

Nineteenth Day of November 1985

[SEAL]

Attest:

DONALD J. QUIGG

Attesting Officer   Commissioner of Patents and Trademarks